US006760053B2

(12) United States Patent
Rother

(10) Patent No.: US 6,760,053 B2
(45) Date of Patent: Jul. 6, 2004

(54) THERMAL PRINTER ELEMENT TESTER

(75) Inventor: David J. Rother, Hastings, MN (US)

(73) Assignee: Rimage Corporation, Minneapolis, MN (US)

( * ) Notice: Subject to any disclaimer, the term of this patent is extended or adjusted under 35 U.S.C. 154(b) by 67 days.

(21) Appl. No.: 10/134,573

(22) Filed: Apr. 29, 2002

(65) Prior Publication Data

US 2003/0202085 A1 Oct. 30, 2003

(51) Int. Cl.[7] ........................ G01D 15/10; G01D 18/10; B41J 2/35

(52) U.S. Cl. ........................................................ 347/191

(58) Field of Search .......................................... 347/191

(56) References Cited

U.S. PATENT DOCUMENTS 5,546,112 A 8/1996 Hunter
5,734,629 A * 3/1998 Lee et al. ...................... 369/34
6,141,298 A 10/2000 Miller
6,148,722 A * 11/2000 Hagstrom ..................... 101/35
6,373,512 B1 * 4/2002 Kawai et al. ............... 347/215

FOREIGN PATENT DOCUMENTS

JP 60092875 A * 5/1985 ............ B41J/29/38
WO WO 00/63020 10/2000

* cited by examiner

*Primary Examiner*—Huan Tran
(74) *Attorney, Agent, or Firm*—Leffert Jay & Polglaze, P.A.

(57) ABSTRACT

A thermal transfer printer has been described that includes a print head integrity tester. The tester measures a resistance of each thermal element of the print head to determine if an element is defective. In one embodiment, the resistance is measured by monitoring a current through the element and comparing to a reference. The printer can also include a power strobe adjustment that automatically adjusts the power applied to the print head elements as the thermal elements age.

15 Claims, 6 Drawing Sheets

THERMAL PRINTER ELEMENT TESTER

FIELD OF THE INVENTION

The present invention relates generally to printers and in particular the present invention relates to thermal printers.

BACKGROUND OF THE INVENTION

Compact disc publishing and replicating systems often use a printer to place a label on the compact disc (CD). Several options are available for printing. One option is to print directly onto the disc using an ink jet printer or a thermal transfer printer.

An important advantage that thermal transfer printers enjoy over inkjet printers used to label CD's is that they do not require specially coated CD's to accept the ink from the printing process. Although printable discs are available, they are more expensive than traditional un-coated media. Further, thermal transfer printers can print with greater speed and print on discs prepared with an inexpensive lacquer coating.

A thermal transfer printer typically includes a stationary print head, a ribbon, and assembly to move the CD under the print head. The print head contains an array of thermal elements, and the ribbon is a plastic film with a wax or resin compound deposited on one side. The print head contacts the ribbon during printing, and the ribbon contacts the media. By heating areas of the ribbon, the wax or resin compound is deposited on the media. Printing occurs by moving ribbon and the media at the same rate across the print head, while firing the heating elements in a desired pattern.

The thermal elements of the print head are susceptible to physical damage and have a limited useful life. If an element becomes defective during a print operation, unacceptable print results may occur. Thermal printers are often integrated into a robotic system to automate the printing of a large quantity of media. If print head damage occurs while the robotics is in operation, a large amount of media can be misprinted and rendered scrap.

For the reasons stated above, and for other reasons stated below which will become apparent to those skilled in the art upon reading and understanding the present specification, there is a need in the art for identifying defective thermal elements.

SUMMARY OF THE INVENTION

The above-mentioned problems with thermal printers and other problems are addressed by the present invention and will be understood by reading and studying the following specification.

In one embodiment, a thermal transfer printer comprises a thermal print head having a resistive heating element, and a test circuit coupled to selectively test the resistive heating element by comparing a current conducted through the resistive heating element with a reference.

In another embodiment, a thermal transfer printer comprises a drawer to hold a print media, and a thermal transfer print head positioned to print an image on the media using a pigment source. The print head comprises a plurality of resistive thermal elements. A strobe circuit is provided to apply power to the plurality of resistive thermal elements, and a test circuit is coupled to the print head to test a resistance of the plurality of resistive thermal elements.

A method of testing a thermal transfer printer comprises initiating a test operation, measuring a resistive characteristic of a reference thermal element, establishing a threshold resistive characteristic, and measuring a resistive characteristic of a non-reference thermal element. The resistive characteristics of then non-reference thermal element are compared to the threshold resistive characteristic.

DETAILED DESCRIPTION OF THE DRAWINGS

In the following detailed description of the preferred embodiments, reference is made to the accompanying drawings, which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense, and the scope of the present invention is defined only by the claims.

One embodiment of the present invention is a direct-contact thermal-transfer line printer used to print onto hard surfaces (media), such as but not limited to CD, CD-R, DVD-R, and other flat, receptive surfaces. The term CD is used herein to include CD's, CD-R, DVD-R, and other flat data storage mediums and not limited to read-only optical storage mediums. The printer includes a print head that presses down against the surface to be printed with a thin thermal ribbon located between a print head heater element array and the print surface. Because the print head comes in direct contact with a hard surface, the print head is susceptible to foreign matter or a non-flat surface. This foreign matter can violate a protective glaze coating on the print head and result in the possible destruction of one or more print elements. A non-flat surface can cause other physical damage to the print head that causes destruction of large areas of the element array.

As stated above, thermal transfer printing requires both heat and pressure to be successful. As a consequence, the print head wears both physically and electrically (the resistance of the element(s) change). This electrical change occurs faster than physical change and can be measured, helping to determine when a print head should be discarded. Historically, print head damage was only visually detectable by observing the printed result. In addition, the user was unable to distinguish the difference between a dirty print head and an electrically damaged print head. That is, foreign matter may be deposited onto the print head heater element and manifest itself as a bad print head when in reality, the print head required only a cleaning to restore print quality.

One embodiment of the present invention uses a combination of electrical circuitry and software to perform a resistance test on the print head element array while the printer is opening its drawer. As such, a user can be notified of an electrically damaged print head prior to printing without adding additional time to the overall printing process.

Figure 1:
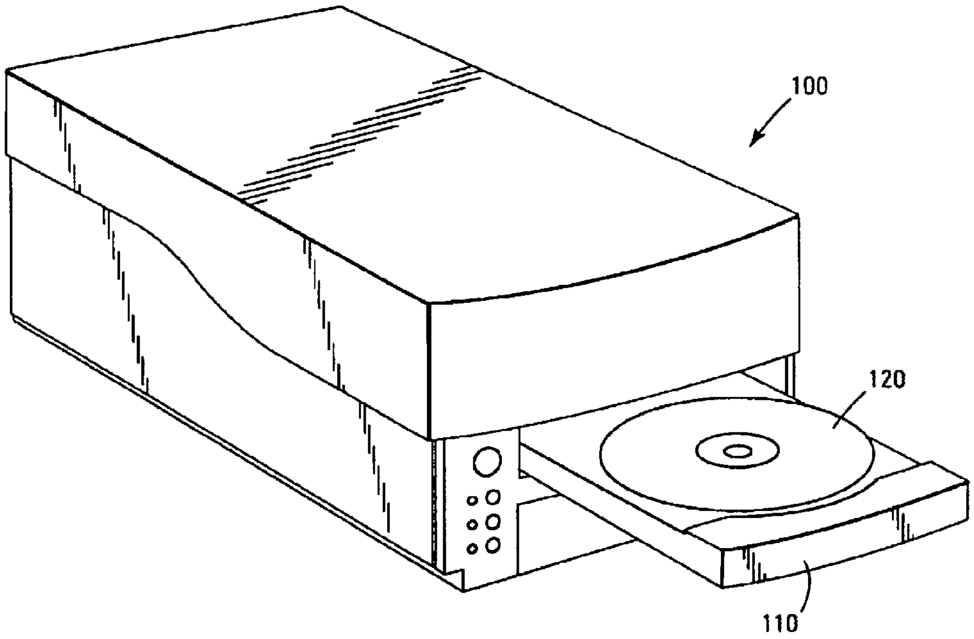
FIG. 1 illustrates a thermal printer of an embodiment of the present invention.

FIG. 1 illustrates a thermal printer 100 of one embodiment of the present invention. The printer includes a drawer 110 that holds a compact disc 120. The drawer opens and closes to move the disc under a thermal print head (not shown). The present invention is not limited to a printer that prints to compact discs. Further, the drawer can be replaced with any receptacle designed to hold a print media.

Figure 2:
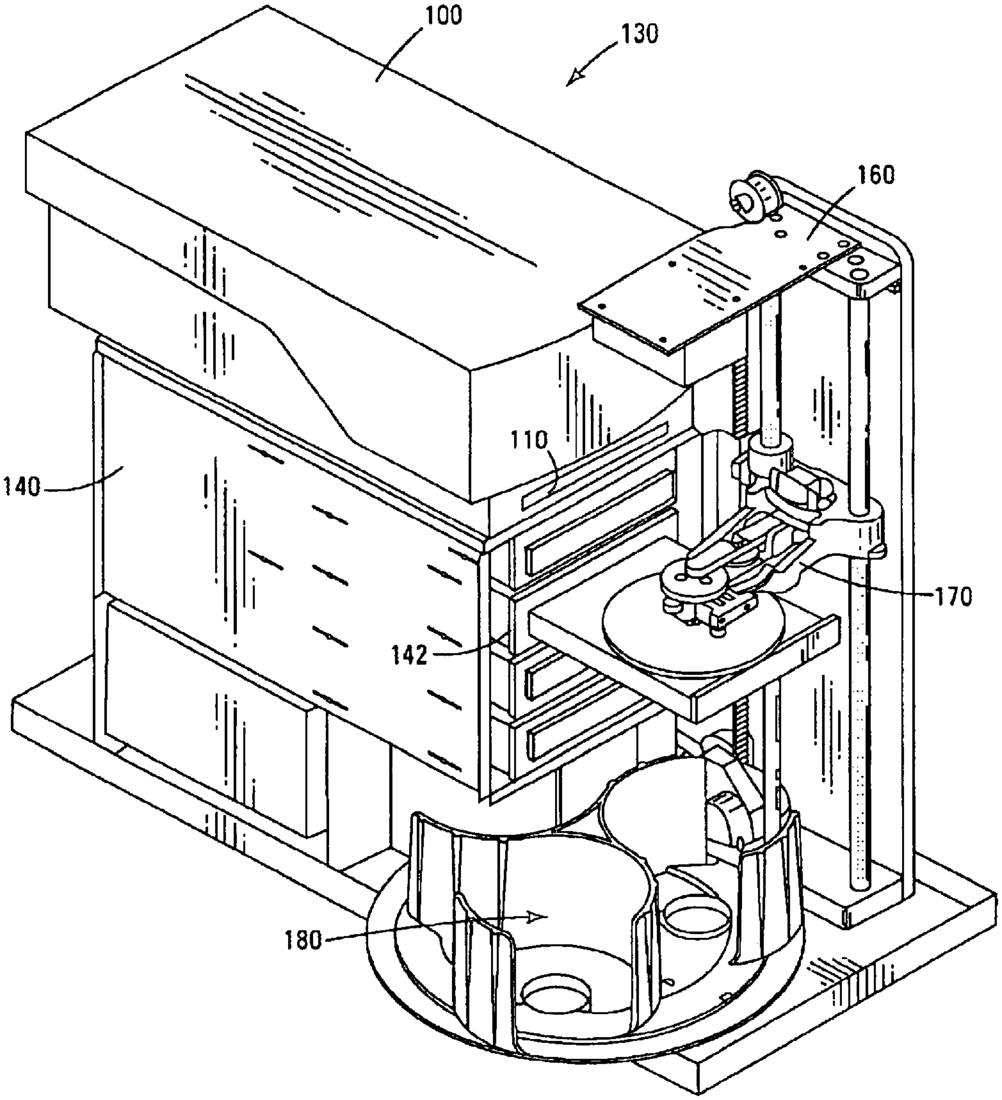
FIG. 2 is a transporter system of another embodiment of the present invention.

The printer can be incorporated into an automatic transporter system 130, as show in FIG. 2. The system includes a base 140 that can house disc recorders 142 or other processing options (not illustrated in detail). A transport mechanism 160 and disc gripper head 170 are used to load and unload discs from the printer drawer 110. The transport mechanism also moves the discs to other locations, such as bin 180. The present invention is not limited to the illustrated automatic transporter system. Design changes can be incorporated to alter the disc gripper head, replace bin 180 with a spindle, or alter the range of movement of the transport mechanism without departing from the present invention. For alternate embodiments of transport mechanisms see U.S. Pat. Nos. 5,914,918 and 6,321,649.

As explained above, the printer uses a thermal print head to transfer pigment from a ribbon to a print media, such as ink to a compact disc. The print head includes numerous aligned thermal resistive elements that are selectively activated based upon a desired print design. In one embodiment, the print head includes 1536 thermal elements. The thermal elements are basically a resistor that generates heat as it conducts current.

Figure 3:
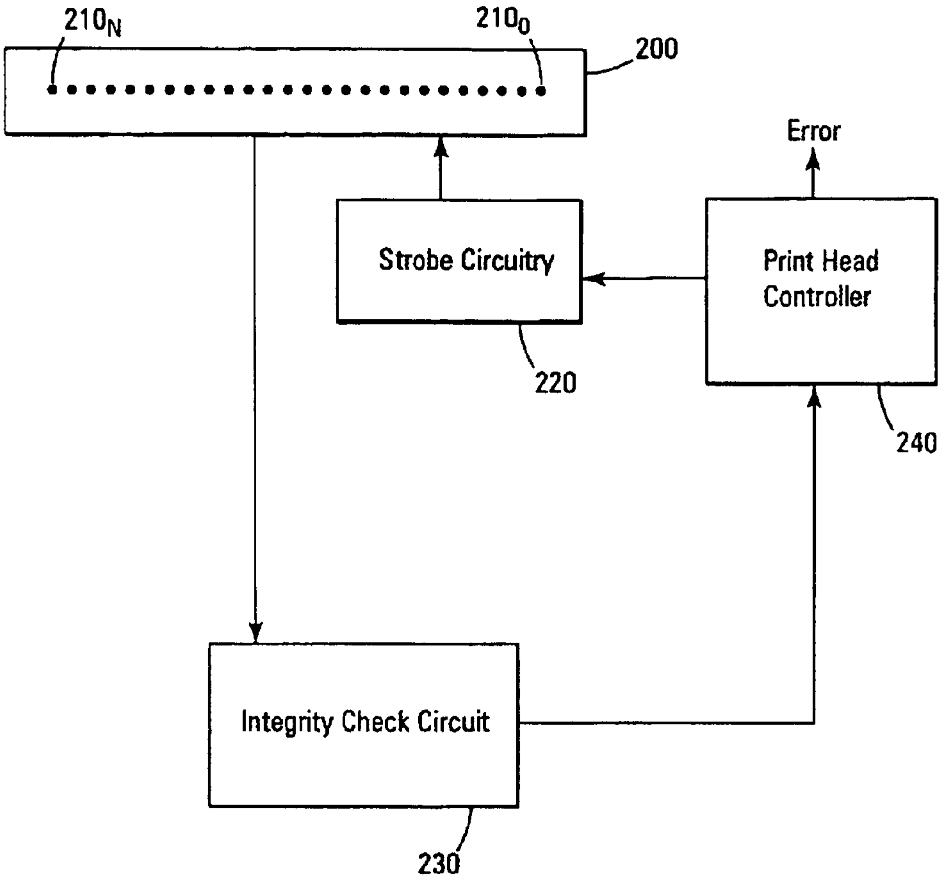
FIG. 3 is a block diagram of a print head control system.

Referring to FIG. 3, a block diagram of a print head control system is described. The print head control system includes a thermal print head 200 that has an array of thermal elements $\mathbf{210}_0$–$\mathbf{210}_N$. Strobe circuitry 220 applies power to the print head in response to a print head controller 240. Integrity check circuit 230 tests the thermal elements $\mathbf{210}_0$–$\mathbf{210}_N$ and provides an output to the print head controller indicating if a defect is detected. In one embodiment, the output of the integrity check circuit is used to adjust the strobe circuitry.

Figure 4:
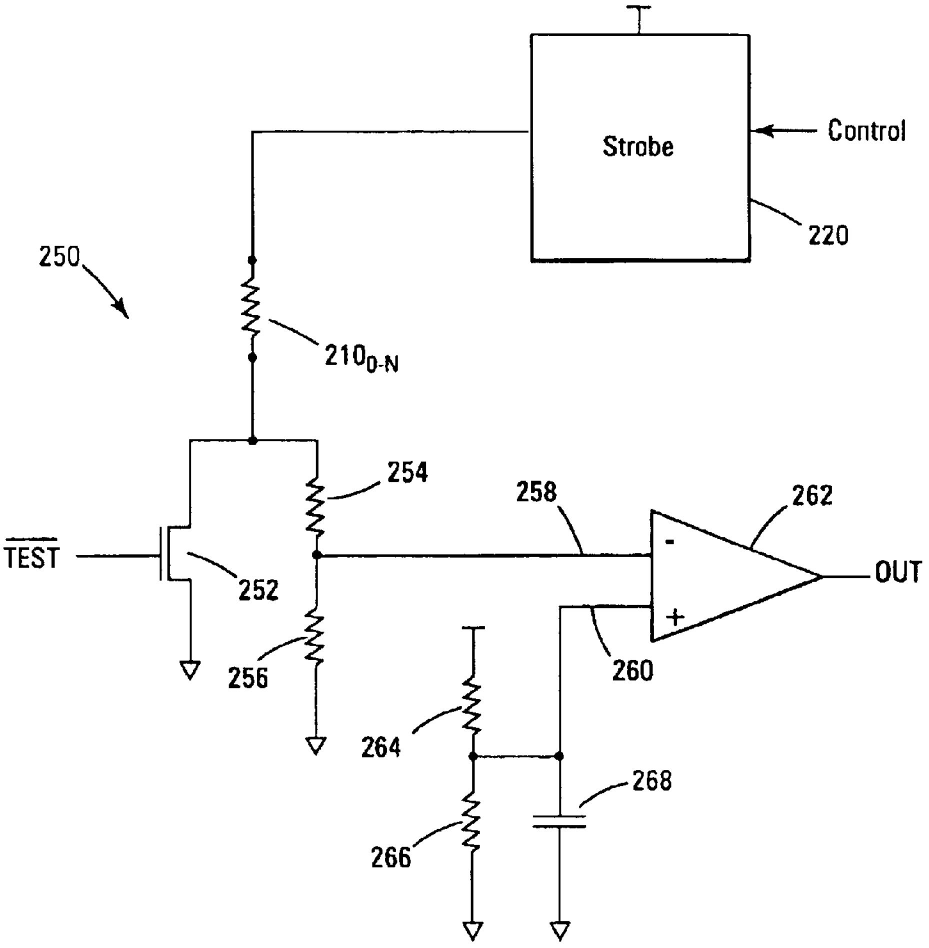
FIG. 4 illustrates an embodiment of integrity check circuit.

As illustrated in FIG. 4, an embodiment 250 of integrity check circuit and strobe circuitry 220 is illustrated. One of the thermal elements $\mathbf{210}_0$ is selectively coupled between strobe circuitry 220 and a current sinking transistor 252. Power to the element is strobed, or pulsed, to conduct current through the element and heat the selected element. A control circuit of the printer (not shown) uses a user defined print design to perform the selection. The print head can comprise more thermal elements than one selection circuit can interface with at one time. The print head, therefore, can be divided into segments that are sequentially controlled using a shared selection circuit. The present invention is not limited to any specific size or configuration of thermal print head.

Because the thermal elements are resistive, they have a useful life and can fail during operation. If an element fails during operation, numerous compact discs can be wasted as a result of a defective printed image. The printer includes a thermal element integrity check circuit 250 that is selectively coupled to test each element. In operation, the thermal elements are tested during a time period between print operations. In one embodiment, the integrity test is performed while the printer is being unloaded and a new CD is being loaded.

The check circuit includes a sense resistor 256 that is selectively coupled to the element $\mathbf{210}_{0\text{-}N}$ under test. An optional current limiting resistor 254 can be included in series with the sense resistor. The sense resistor is coupled to a first input node 258 (test node) of a comparator circuit 262. The second input node 260 (reference node) of the comparator circuit is coupled to a reference voltage divider circuit, resistors 264 and 266. The output of the comparator is coupled to a test controller, such as controller 240 of FIG. 3.

During testing, the current sinking transistor 252 is turned OFF such that current conducted through a thermal element during the test operation is sunk through resistors 254 and 256. Each thermal element is selectively coupled to the check circuitry and a power source 220. The output of comparator 262 is monitored, and the time needed for the test node voltage to exceed the reference node 260 voltage is measured. If the thermal element is burned out, its resistance increases or may be an open circuit. As such, it may not conduct enough current to trigger the comparator.

The print head includes some thermal elements that are not located within an active print region. For example, elements $\mathbf{210}_0$ and $\mathbf{210}_N$ are located on the ends of the linear array and are outside of a boundary of the CD dimensions. As such, they are not heated during print operations and remain relatively stable over the life of the print head. In other embodiments, reference elements can be located anywhere in the print head and are not limited to the ends.

During testing, the reference elements are coupled to check circuit 250 and a time measurement is taken for the reference element to trigger the comparator circuit. This measurement is used to set a threshold for each active element tested. Because weak elements have a higher resistance than the reference elements, their trigger time is greater than the reference measurement. The control circuit uses the reference measurement as an average and generates a threshold that is longer than the reference, but still insures acceptable element operation. A time-out limit is also used to stop the test if an element cannot trigger the comparator, such as an open circuit element. Weak elements and burned-out elements, therefore, can be detected.

Figure 5:
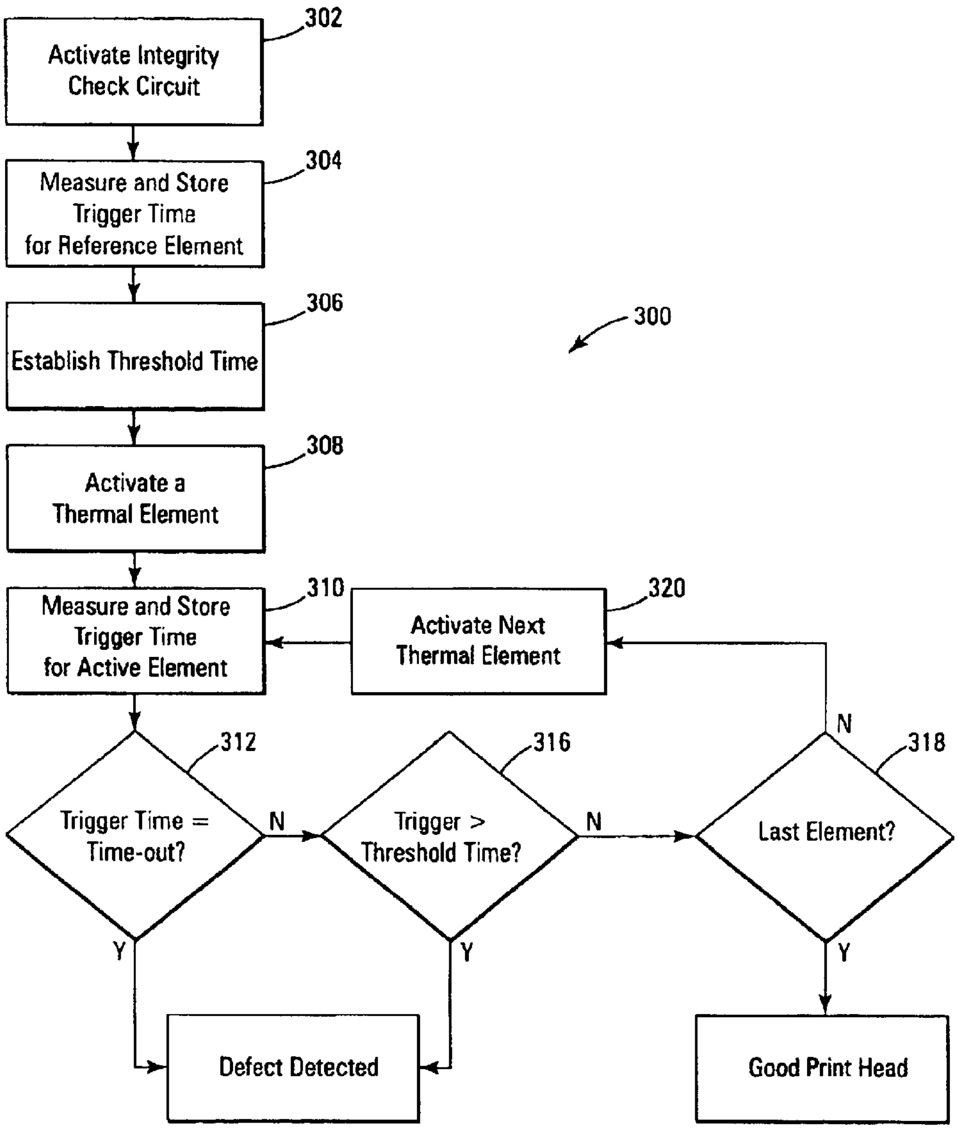
FIG. 5 is a general flow chart of a method of operating a printer.

Referring to FIG. 5, a general flow chart of a method of operating a printer is described. The printer activates an integrity check 302 between print jobs. One or more reference elements are tested 304 and a trigger time is used to establish the threshold level 306. A thermal element is then coupled to the test circuit and activated 308. The trigger time for the tested element is measured 310. If the trigger time exceeds a time-out level 312, the test is ended and a defective element signal is provided to the control circuitry. The printer can then interrupt the print job and provide an error code to notify a user that a defect has occurred. Likewise, if the measured trigger time is greater than the threshold 316, the test is ended and a defective element signal is provided to the control circuitry. If the element tested was the last element 318, the test is ended and the print head is good. If the element was not the last, the next element is activated 320 and the evaluation steps repeated.

Prior thermal printers often include a user controlled strobe setting. The strobe setting allows the user to adjust the power applied to the thermal elements during a print operation. Because the thermal elements become weaker as a function of repeated use, the strobe setting allowed the user to compensate for weaker elements over time. Users, however, often initially select the highest strobe setting based upon the misconception that the print quality will be improved. As a result, the degradation of the print head is actually accelerated.

One embodiment of the present invention allows the thermal printer to automatically adjust the power setting of the thermal elements. In this embodiment, the above-described test is performed on the thermal print head. The time differential between the reference elements and the tested thermal elements is used to select a power, or strobe, setting. That is, the time differential increases as the element performance (thermal dissipation) degrades. Increasing the power applied to a thermal element allows the degraded element to maintain a more uniform thermal dissipation over its life.

Figure 6:
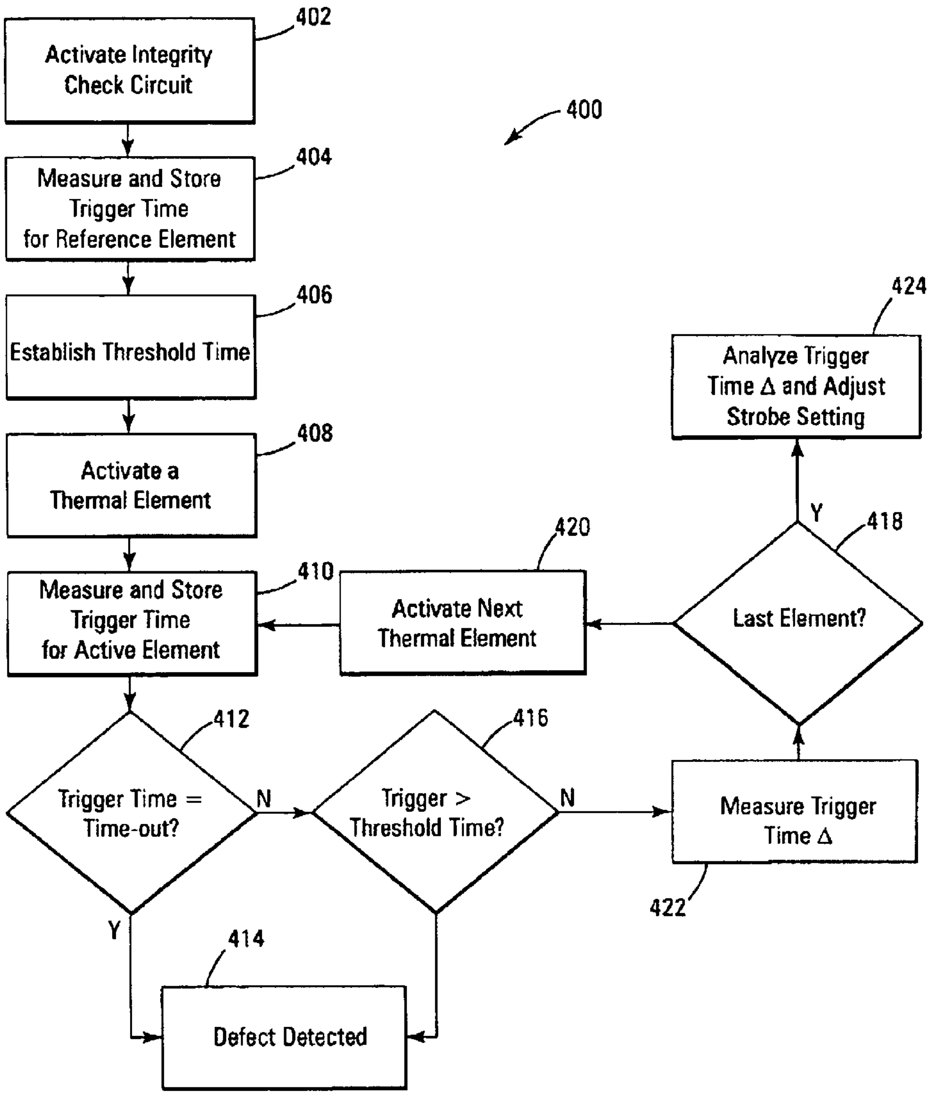
FIG. 6 is a general flow chart of another method of operating a printer.

Referring to FIG. 6, a general flow chart of an alternate method of operating a printer is described. The printer activates an integrity check 402 between print jobs. One or more reference elements are tested 404 and a trigger time is used to establish the threshold level 406. A thermal element is then coupled to the test circuit and activated 408. The trigger time for the tested element is measured 410. If the trigger time exceeds a time-out level 412, the test is ended and a defective element signal is provided to the control circuitry. The printer can then interrupt the print job and provide an error code to notify a user that a defect has occurred. Likewise, if the measured trigger time is greater than the threshold 416, the test is ended and a defective element signal is provided to the control circuitry.

The difference between the measures trigger time and the reference trigger time is determined 422. The average difference is used after the test is successfully ended. If the element tested was the last element 418, the test was successful and the average difference in trigger time is used to adjust the strobe setting (pulse length) 424, if necessary. If the element was not the last, the next element is activated 420 and the evaluation steps repeated.

Conclusion

A thermal transfer printer has been described that includes a print head integrity tester. The tester measures a resistance of each thermal element of the print head to determine if an element is defective. In one embodiment, the resistance is measured by monitoring a current through the element and comparing to a reference. The printer can also include a power strobe adjustment that automatically adjusts the power applied to the print head elements as the thermal elements age.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A thermal transfer printer comprising:

a thermal print head having a resistive heating element; and a test circuit coupled to selectively test the resistive heating element by comparing a current conducted through the resistive heating element with a reference, wherein the reference is established by measuring a current conducted through a reference resistive heating element.

2. A thermal transfer printer comprising:

a thermal print head having a resistive heating element; and a test circuit coupled to selectively test the resistive heating element by comparing a current conducted through the resistive heating element with a reference, wherein the test circuit comprises:

a sense resistor;

a reference current resistor divider; and a comparator circuit coupled to the reference current resistor divider and the sense resistor, wherein the comparator circuit determines if a voltage drop across the sense resistor is larger than a voltage drop of the resistor divider.

3. A thermal transfer printer comprising:

a thermal print head having a resistive heating element; and a test circuit coupled to selectively test the resistive heating element by comparing a current conducted through the resistive heating element with a reference; and a strobe circuit to apply power to the thermal print head, wherein the applied power is adjusted in response to the test circuit.

4. A thermal transfer printer comprising:

a receptacle to hold a print media;

a thermal transfer print head positioned to print an image on the print media using a pigment source, the print head comprises a plurality of resistive thermal elements, wherein the print head comprises a reference resistive thermal element;

a strobe circuit to apply power to the plurality of resistive thermal elements; and a test circuit coupled to the print head to test a resistance of the plurality of resistive thermal elements.

5. The thermal transfer printer of claim 4 wherein the test circuit uses a resistance of the reference resistive thermal element to establish a reference threshold for comparison with the resistance of each thermal element.

6. The thermal transfer printer of claim 4 further comprises a print head controller to selectively couple the strobe circuit to the plurality of resistive thermal elements.

7. The thermal transfer printer of claim 4 wherein the test circuit tests the resistance of each thermal element by comparing a current conducted by each thermal element against a reference current.

8. The thermal transfer printer of claim 4 wherein the test circuit checks the resistance of each thermal element before each cycle of printing to new media.

9. A thermal transfer printer comprising:

a receptacle to hold a print media;

a thermal transfer print head positioned to print an image on the print media using a pigment source, the print head comprises a plurality of resistive thermal elements;

a strobe circuit to apply power to the plurality of resistive thermal elements; and a test circuit coupled to the print head to test a resistance of the plurality of resistive thermal elements, wherein a power setting of the strobe circuit is controlled by a print head controller in response to the test circuit.

10. A transfer thermal printer system comprising:

a compact disc (CD) transporter having a robotic assembly to physically move CD's; and a thermal transfer printer comprising, a drawer to hold a target CD to be printed, wherein the robotic assembly loads and un-loads the CD in the drawer, a thermal transfer print head positioned to print an image on the CD using a pigment source, the print head comprises a plurality of resistive thermal elements, a strobe circuit to apply power to the plurality of resistive thermal elements, a test circuit coupled to the print head to test the plurality of resistive thermal elements, wherein the test circuit checks a resistance of each thermal element, and a print head controller coupled to the strobe circuit and the test circuit, wherein the print head controller selectively couples the plurality of resistive thermal elements to the strobe circuit and monitors an output of the test circuit, the print head controller provides an indication when a defective resistive thermal element is detected, wherein the print head controller adjusts a pulse time of the strobe circuit in response to the test circuit.

11. A method of testing a thermal transfer printer comprising:

initiating a test operation;

measuring a resistive characteristic of a reference thermal element;

establishing a threshold resistive characteristic;

measuring a resistive characteristic of a non-reference thermal element; and comparing the resistive characteristics of the non-reference thermal element to the threshold resistive characteristic.

12. The method of claim 11 wherein the resistive characteristics are measured by monitoring a voltage drop across a test resistor coupled in series to the non-reference thermal element.

13. The method of claim 11 further comprises adjusting a duration of a control strobe applied to the non-reference thermal element in response to the comparison.

14. A method of testing a thermal transfer printer comprising:

monitoring voltage drop across a test resistor coupled in series to an active reference thermal element;

measuring a first time period required to develop a voltage drop across the test resistor that is equal to a reference voltage;

establishing a threshold time period based on the measured first time period;

substituting a test thermal element for the reference thermal element in series with the test resistor;

measuring a second time period required to develop the voltage drop across the test resistor that is greater than the reference voltage;

comparing the second time period to the threshold time period; and determining if the test thermal element is defective based upon the comparison.

15. A thermal transfer printer comprising:

a drawer to hold a compact disc (CD);

a thermal transfer print head positioned to print an image on the CD using a pigment source, the print head comprises a plurality of resistive thermal elements, wherein the print head comprises a reference resistive thermal element, and wherein the test circuit uses a resistance of the reference resistive thermal element to establish a reference threshold for comparison with the resistance of each thermal elements;

a strobe circuit to apply power to the plurality of resistive thermal elements; and a test circuit coupled to the print head to test a resistance of the plurality of resistive thermal elements.

* * * * *